US011046234B2

(12) United States Patent
Ziegler

(10) Patent No.: US 11,046,234 B2
(45) Date of Patent: Jun. 29, 2021

(54) RATCHET TIE-DOWN DEVICE

(71) Applicant: Shape Shifter Design, Inc., El Cajon, CA (US)

(72) Inventor: Scott William Ziegler, El Cajon, CA (US)

(73) Assignee: Scotty of California, Inc., El Cajon, CA (US)

( * ) Notice: Subject to any disclaimer, the term of this patent is extended or adjusted under 35 U.S.C. 154(b) by 18 days.

(21) Appl. No.: 16/454,046

(22) Filed: Jun. 26, 2019

(65) Prior Publication Data

US 2019/0389362 A1 Dec. 26, 2019

Related U.S. Application Data

(60) Provisional application No. 62/690,312, filed on Jun. 26, 2018.

(51) Int. Cl.
*B60P 7/08* (2006.01)
*F16M 13/02* (2006.01)

(52) U.S. Cl.
CPC ............ *B60P 7/083* (2013.01); *B60P 7/0846* (2013.01); *F16M 13/02* (2013.01)

(58) Field of Classification Search
CPC ....... B60P 7/083; B60P 7/0846; B60P 7/0823; B60P 3/10; F16M 13/02; B66D 3/10; B60R 7/15
See application file for complete search history.

(56) References Cited

U.S. PATENT DOCUMENTS

| 5,282,706 | A | * | 2/1994 | Anthony | B60P 3/10 |
| | | | | | 24/68 CD |
| 7,503,736 | B1 | * | 3/2009 | Chen | B60P 7/083 |
| | | | | | 410/100 |
| 8,312,601 | B2 | * | 11/2012 | Huang | B60P 7/083 |
| | | | | | 24/68 CD |
| 8,490,930 | B2 | * | 7/2013 | Huang | B60P 7/15 |
| | | | | | 248/125.2 |
| 8,601,645 | B2 | * | 12/2013 | Huang | B60P 7/083 |
| | | | | | 24/68 CD |
| 2013/0277630 | A1 | * | 10/2013 | Kingery | B66D 3/10 |
| | | | | | 254/376 |
| 2014/0008480 | A1 | * | 1/2014 | Kingery | B60P 7/0823 |
| | | | | | 242/389 |
| 2016/0347233 | A1 | * | 12/2016 | Kingery | B60P 7/083 |

* cited by examiner

*Primary Examiner* — Robert Sandy
*Assistant Examiner* — David M Upchurch

(57) ABSTRACT

A tie-down device configured to secure a position of an object is described that includes an extendable anchor that is extendable from a body of the tie-down device and configured to secure to a location, a spool comprising a circular plate including a first plurality of ratchet teeth along a circumference of the circular plate, a handle pivotably coupled to the body and including a second plurality of ratchet teeth, and a tab configured to be pivoted between a first position and a second position. The first position of the tab configured to allow the cog to engage with the spool such that the spool does not spin freely, and the second position of the tab configured to allow the cog to disengage from the spool such that the spool spins freely. Various embodiments of the tie-down device are described, as well as related systems, methods, and articles of manufacture.

16 Claims, 12 Drawing Sheets

RATCHET TIE-DOWN DEVICE

CROSS-REFERENCE TO RELATED APPLICATIONS

The present application claims priority to U.S. Patent Application No. 62/690,312, filed Jun. 26, 2018, entitled RATCHET TIE-DOWN DEVICE, the disclosure of which is incorporated herein by reference in its entirety.

FIELD

Ratchet tie-down devices and associated methods are disclosed herein.

BACKGROUND

Tie-down devices can secure objects to various other objects and/or locations, such as in the back of pick-up trucks or on tables. In general, conventional ratchet based tie-down devices can be large, not intuitive, and cumbersome to use. Additionally, conventional ratchet based tie-down devices are not suitable for smaller, more compact applications.

SUMMARY

Aspects of the current subject matter relate to a tie-down device configured to secure a position of an object. In one aspect, the tie-down device may include an extendable anchor that is extendable from a body of the tie-down device and may be configured to secure to a first location. A spool may be configured to assist with controlling a length at which the extendable anchor may extend from the body. The spool may include a circular plate having a first plurality of ratchet teeth along a circumference of the circular plate. A handle may have a distal end pivotably coupled to the body and may have a second plurality of ratchet teeth. The handle may be configured to engage the first plurality of ratchet teeth when the handle is in a first open position and disengage from the first plurality of ratchet teeth when the handle is in a closed position. Pivoting the handle into the first open position may cause rotation of the spool in a first rotational direction. A cog may be configured to pivot between an engaged position and a disengaged position. The cog may be configured to prevent the spool from rotating in a second rotational direction when the cog is in the engaged position, thereby preventing the extendable anchor from further extending from the body.

In some variations one or more of the following features can optionally be included in any feasible combination. The tie-down device may include a hinge element having a first hinge that pivotably couples the handle to the hinge element and a second hinge that pivotably couples the hinge element to the body. The hinge element may allow the handle to form the first open position and a second open position. The first open position may allow the second plurality of ratchet teeth to engage the first plurality of ratchet teeth and the second open position may allow the second plurality of ratchet teeth to be positioned a distance away from the first plurality of ratchet teeth. The distance between the first plurality of ratchet teeth and the second plurality of ratchet teeth may prevent binding of the first plurality of ratchet teeth and the second plurality of ratchet teeth when the handle is moved to the closed position. The extendable anchor may retract into the body when the spool rotates in the first rotational direction and may extend from the body when the spool rotates in the second rotational direction. The distal end of the cog may be engaged with at least one of the first plurality of ratchet teeth to prevent rotation of the spool in the second rotational direction and may allow rotation of the spool in the first rotational direction. The rotation of the spool in the first rotational direction may increase tension along at least the extendable anchor when the extendable anchor is secured to the first location. The disengaged position of the cog may include the distal end of the cog being disengaged from the at least one of the first plurality of ratchet teeth, thereby allowing release of tension along at least the extendable anchor.

In some embodiments, the tie-down device may include a tab configured to be pivoted between a first position and a second position. The first position may cause the cog to be in the engaged position. The second position may cause the cog to be in the disengaged position. Pivoting of the handle to the first open position may include engaging the second plurality of ratchet teeth with the first plurality of ratchet teeth and may cause the spool to rotate in the first rotational direction. Pivoting of the handle to the closed position may include disengaging the first plurality of ratchet teeth from the second plurality of ratchet teeth.

In some embodiments, the tab can include a first coupling feature and the handle can include a second coupling feature that is configured to releasably couple to the first coupling feature. Additionally, coupling of the first coupling feature to the second coupling feature can secure the tab in the first position. In some embodiments, the tie-down device may include a tab magnet coupled to the tab and a handle magnet coupled to the handle and positioned to allow the handle magnet to align with the tab magnet when the tab is in the first position.

In some embodiments, the tie-down device may include a fixed length anchor configured to secure to a second location. Retracting the extendable anchor may increase tension along at least one of the extendable anchor and the fixed length anchor to thereby secure the object at the position. The tie-down device may include a load capacity of approximately 50 pounds to 100 pounds. The handle may be curved and may be configured to cover the spool and prevent exposure of at least the first plurality of ratchet teeth when in the closed position.

In another interrelated aspect of the current subject matter, a method includes securing a position of an object. For example, the method may include securing, by a first attachment mechanism, an extendable anchor of a tie-down device to a first location. The tie-down device may include a spool configured to assist with controlling a length at which the extendable anchor may extend from the body. The spool may include a circular plate having a first plurality of ratchet teeth along a circumference of the circular plate. A handle may have a distal end pivotably coupled to the body and may have a second plurality of ratchet teeth. The handle may be configured to engage the first plurality of ratchet teeth when the handle is in a first open position and disengage from the first plurality of ratchet teeth when the handle is in a closed position. Pivoting the handle into the first open position may cause rotation of the spool in a first rotational direction. A cog may be configured to pivot between an engaged position and a disengaged position. The cog may be configured to prevent the spool from rotating in a second rotational direction when the cog is in the engaged position, thereby preventing the extendable anchor from further extending from the body.

The method for securing a position of an object may further include securing, by a second attachment mechanism, a fixed length anchor of the tie-down device to a second location. The method for securing a position of an object may include pivoting a tab to a first position to thereby place the cog in the engaged position. The engaged position of the cog may prevent rotation of the spool in the second rotational direction. The method for securing a position of an object may include pivoting the handle to the first open position thereby engaging the second plurality of ratchet teeth with the first plurality of ratchet teeth and may cause an increase in tension along at least the extendable anchor.

In some embodiments, the method may include pivoting a hinge element to move the handle into a second open position. The second open position may allow the second plurality of ratchet teeth to be positioned a distance away from the first plurality of ratchet teeth. The method for securing a position of an object may include pivoting the handle to the closed position thereby covering the spool and preventing exposure of the first plurality of ratchet teeth. The method may include pivoting the tab to a second position to place the cog in the disengaged position, thereby allowing rotation of the spool in the second rotational direction.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The invention will be more fully understood from the following detailed description taken in conjunction with the accompanying drawings, in which.

DETAILED DESCRIPTION

Figure 1:
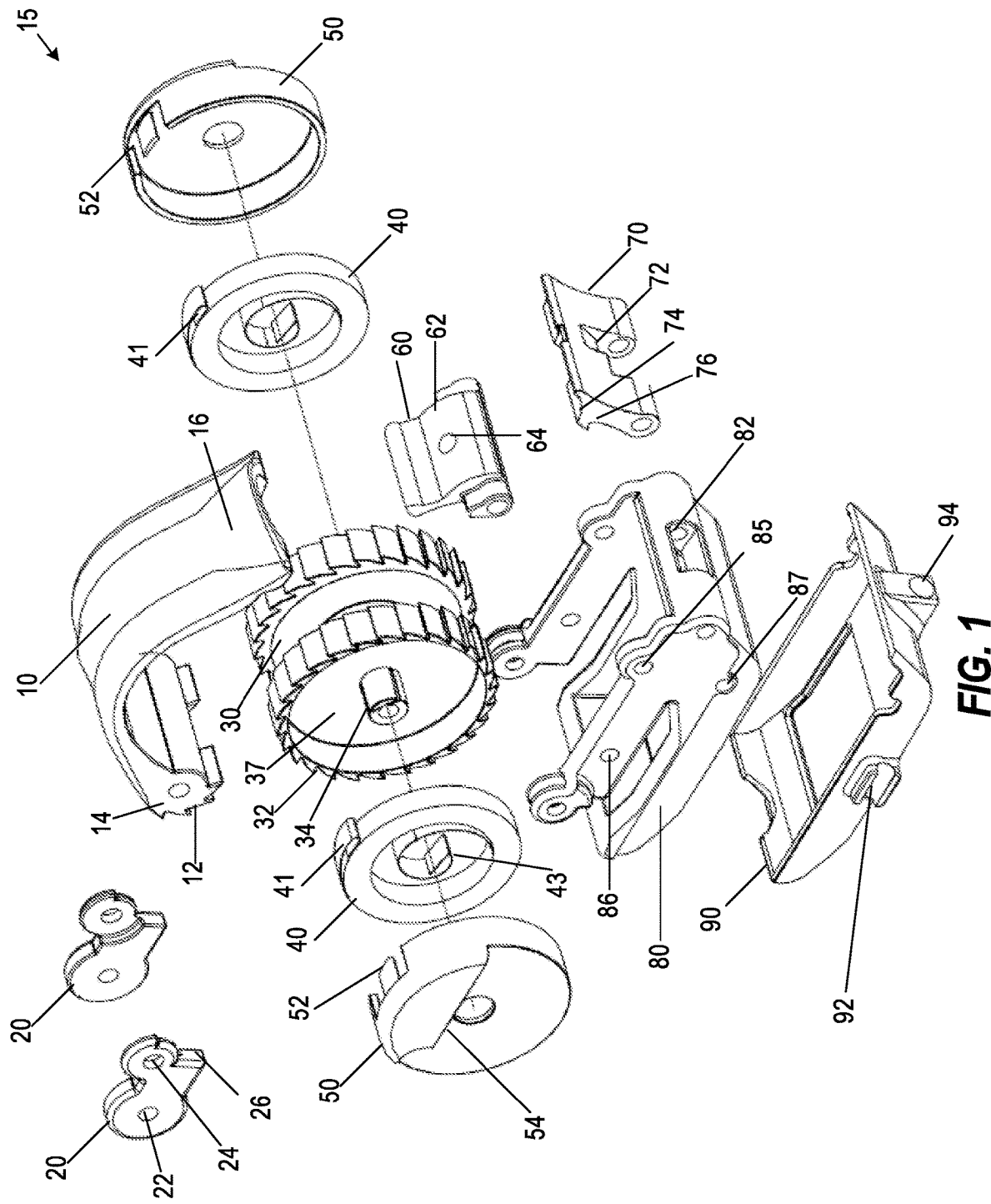
FIG. 1 is an exploded perspective view of a tie-down device.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments. The features illustrated or described in connection with one exemplary embodiment may be combined with the features of other embodiments. Such modifications and variations are intended to be included within the scope of the present disclosure.

The methods and devices disclosed herein can provide a number of advantages. For example, in some embodiments, miniaturized ratcheted tie-down devices that fit in a user's pocket can be used to secure one or more of a variety of sized objects. Additionally, the ratchet tie-down devices described herein can be intuitive for a user to efficiently use.

Various embodiments of tie-down devices are described herein that include various features and configurations that allow the tie-down devices to be conveniently small, such as for easy transport (e.g., in a pocket of a user), and mechanically strong to effectively tie down a variety of objects to a variety of locations (e.g., trucks, tables, etc.). For example, use of these tie-down devices can secure objects in or on vehicles or platforms. Tie-down devices described herein may releasably secure one or more objects, and/or vary tension along fixed-length or extendable anchors. In some embodiments, the tie-down device may have a load range of approximately 50 pounds to approximately 100 pounds.

In some embodiments, the tie-down device can include a fixed length anchor and an extendable anchor that can extend and retract relative to a body of the tie-down device. The tie-down device can be configured to allow or prevent the extendable anchor from extending relative to a rotatable spool positioned within a body of the tie-down device. For example, the tie-down device can include a cog that, when in a first position, can engage with one or more features of the spool including spool teeth or a mating feature configured to prevent rotation of the spool, thereby preventing the extendable anchor from extending while allowing retracting of the extendable anchor. Additionally, when the cog is in a second position such that the cog is disengaged from the spool, the extendable anchor can be allowed to retract or extend. In some embodiments, the tie-down device can include a rotating spool that retracts the extendable anchor and/or increases a tension along the extendable anchor. For example, pivoting of the handle when the cog is in the engaged position can force a retraction of the extendable anchor and/or increase a tension along the extendable anchor. Such forced retraction can be a result of teeth along the handle exerting a force on the teeth along the spool, thereby forcing the spool to rotate and either retract the extendable anchor or increase tension therealong. This can allow the tie-down device to effectively tie-down one or more objects relative to a location.

An example use of the tie-down device can include a user coupling the fixed length anchor to a first location. The user can then unlock the tie-down device to allow the extendable anchor to extend from the body as the extendable anchor is pulled for securing to a second location. The fixed length anchor, tie-down device, and/or extendable anchor may contact and apply pressure to an object. For example, the first and second locations can be positioned on adjacent or opposite sides of a pickup truck bed upon which the object is positioned. Once attached on both ends, the extendable anchor may be shortened by pivoting the handle relative to the body to allow teeth along the handle to engage and apply a force against teeth along the spool, thereby causing the spool to rotate. Such rotation of the spool causes shortening and/or an increase in tension along at least one of the fixed and extendable anchor. For example, the handle can be pivoted a number of times until the tie-down device is effectively securing an object positioned between the first and second locations. More than one tie-down device can be used in combination for securing one or more objects to another object or to a location.

The ends of the fixed and extendable anchors can be secured using any number of a variety of securing features, such as hooks, clasps, loops, screws, clamps, or other attachment mechanisms that make it possible to attach the fixed length anchor and/or extendable anchor to a location (e.g., an anchor cleat). The anchors can anchor to any number of attachment features, such as anchor cleats, holes, loops, appendages, or edges.

FIGS. 1-3 and 5-12 illustrate various views of an embodiment of a tie-down device 15 consistent with implementations of the current subject matter. The tie-down device 15 includes various features and configurations that allow for a compact and user-friendly device for efficiently and effectively securing one or more objects, as will be described in greater detail herein. In one embodiment, the tie-down device 15 may include the following dimensions: a height of approximately 1 inch, a width of approximately 2 inches, and a length of approximately 1.25 inch. Such dimensions are for example only and the tie-down device may be sized to be larger or smaller.

Figure 2A:
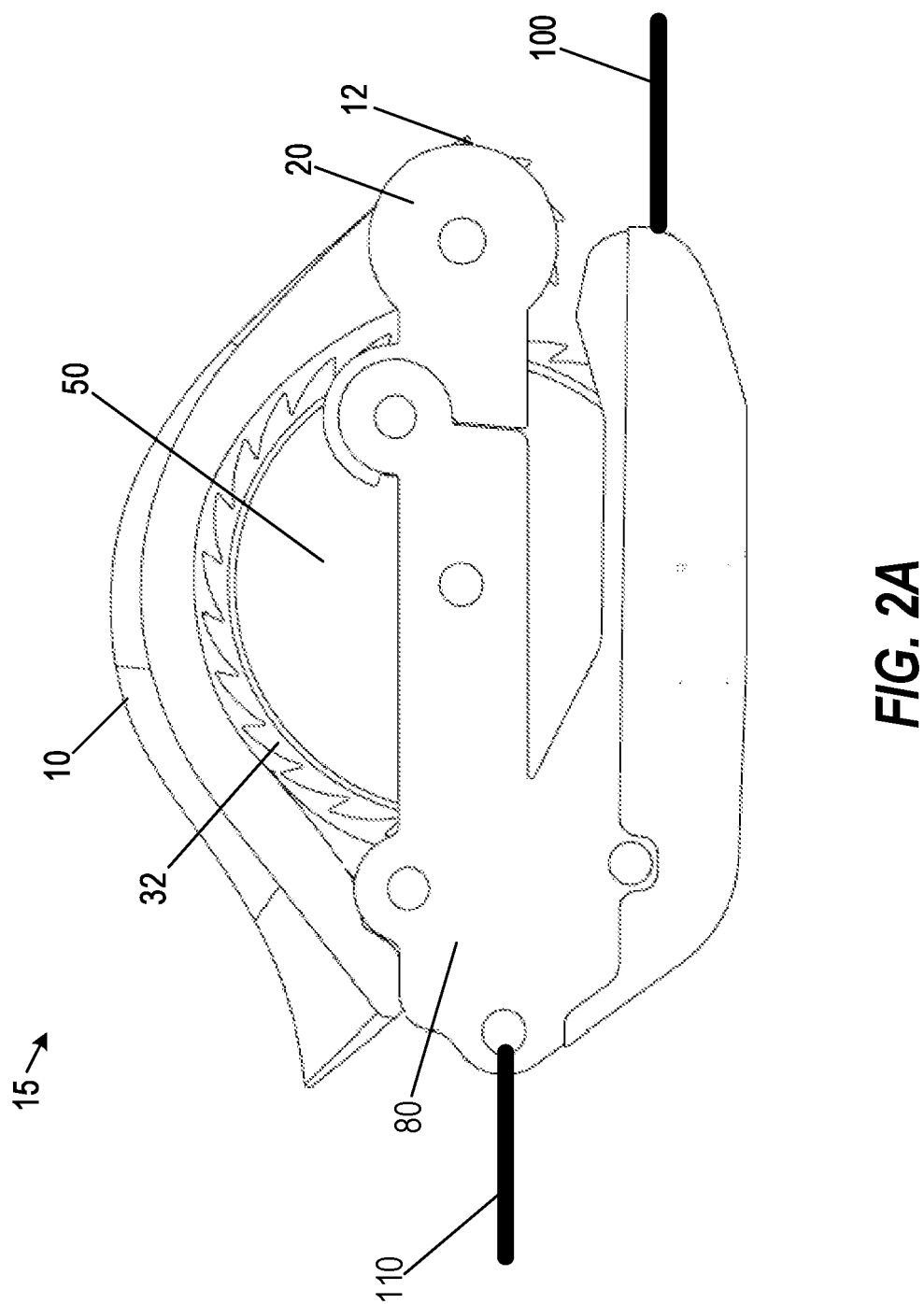
FIG. 2A is a side view of the tie-down device of FIG. 1 with an extendable anchor and a fixed length anchor.

As shown in FIG. 1, the tie-down device 15 can include a handle 10, hinge elements 20, a spool 30, springs 40, spring covers 50, a tab 60, a cog 70, a body 80, and an over-molded body 90. Additionally, the tie-down device 15 can include a fixed length anchor 110 and an extendable anchor 100, as shown in FIG. 2A. The ends of the fixed length anchor 110 and extendable anchor 100 can be coupled to first and second locations, respectively. Once coupled, the tie-down device 15 can secure an object by shortening the extendable anchor 100, such as by rotating the spool 30 in a first rotational direction. In one embodiment, the extendable anchor 100 may include a length of approximately 4 feet in length and a width of approximately 0.25 inch. In other embodiments, the extendable anchor 100 may have a length ranging from approximately 2 feet to 8 feet, and a width ranging from 0.15 inch to 1 inch. Other lengths and widths of the extendable anchor are within the scope of this disclosure.

Figure 2B:
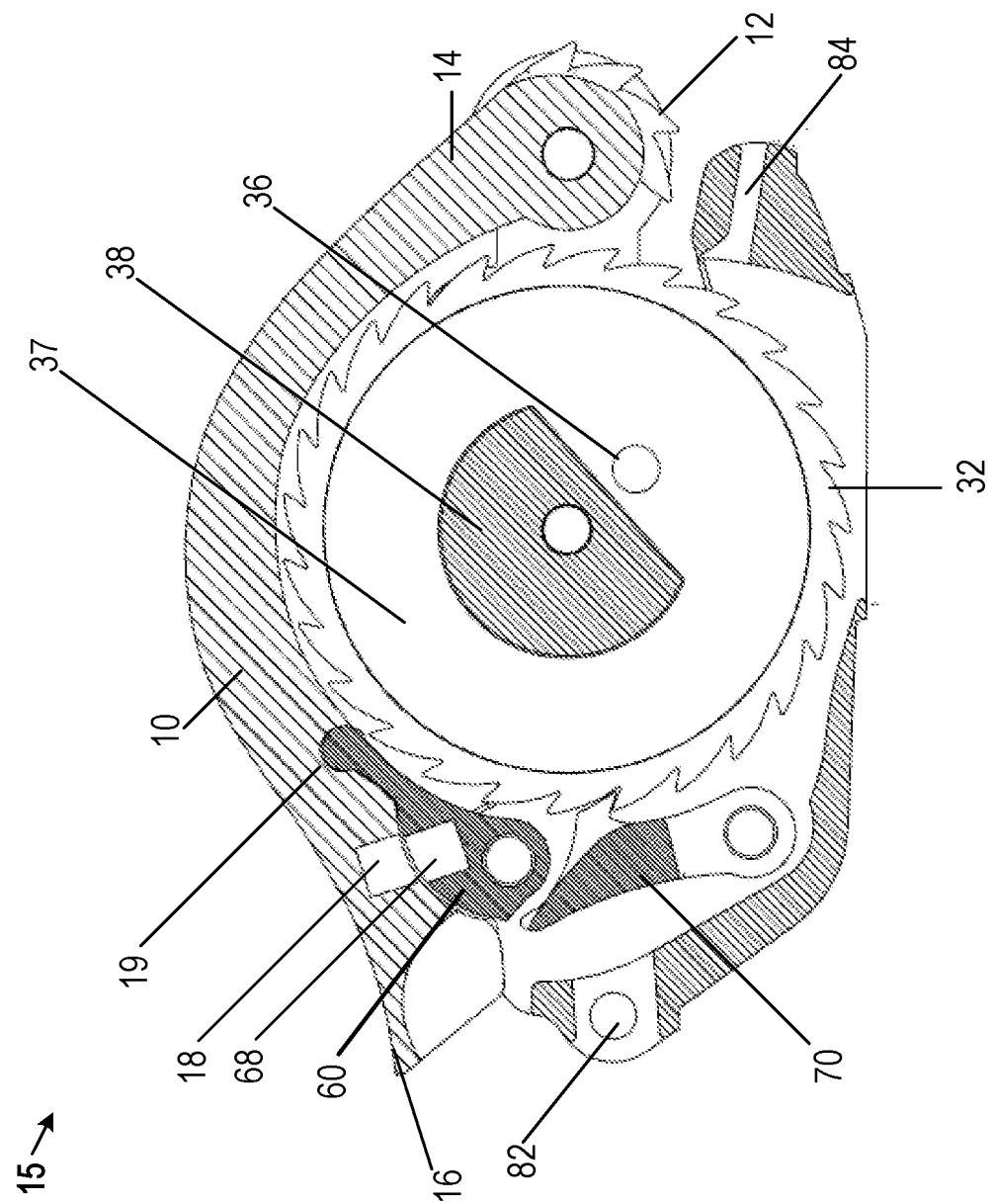
FIG. 2B is a cross-sectional view of the tie-down device of FIG. 1.

In some embodiments, the extendable anchor 100 can be shortened by pivoting the tab 60 to an up position, which causes the cog 70 to engage with the spool 30. Once engaged, the cog 70 stops the spool 30 from rotating in a counter-first rotational direction. The extendable anchor 100 can be retracted by lifting and lowering the handle 10, such as in a ratcheting motion. For example, each time the user lifts the handle 10, handle teeth 12 engage with spool teeth 32, and cause the spool 30 to rotate in a first rotational direction to retract the extendable anchor 100 such that a tension is created along the extendable anchor 100 and/or the fixed length anchor 110. As rotation of the spool 30 increases, the tension along the extendable anchor 100 and/or the fixed length anchor 110 increases. When the handle 10 is lowered, the handle 10 and spool 30 may not engage, as the handle teeth 12 and spool teeth 32 are separated and not in contact, such as shown in FIG. 2B. The following paragraphs describe embodiments of the handle 10, the spool 30, the tab 60, and the cog 70 in more detail. The following paragraphs also describe the hinge elements 20, the springs 40, the spring covers 50, the body 80, and the over-molded body 90.

Figure 5A:
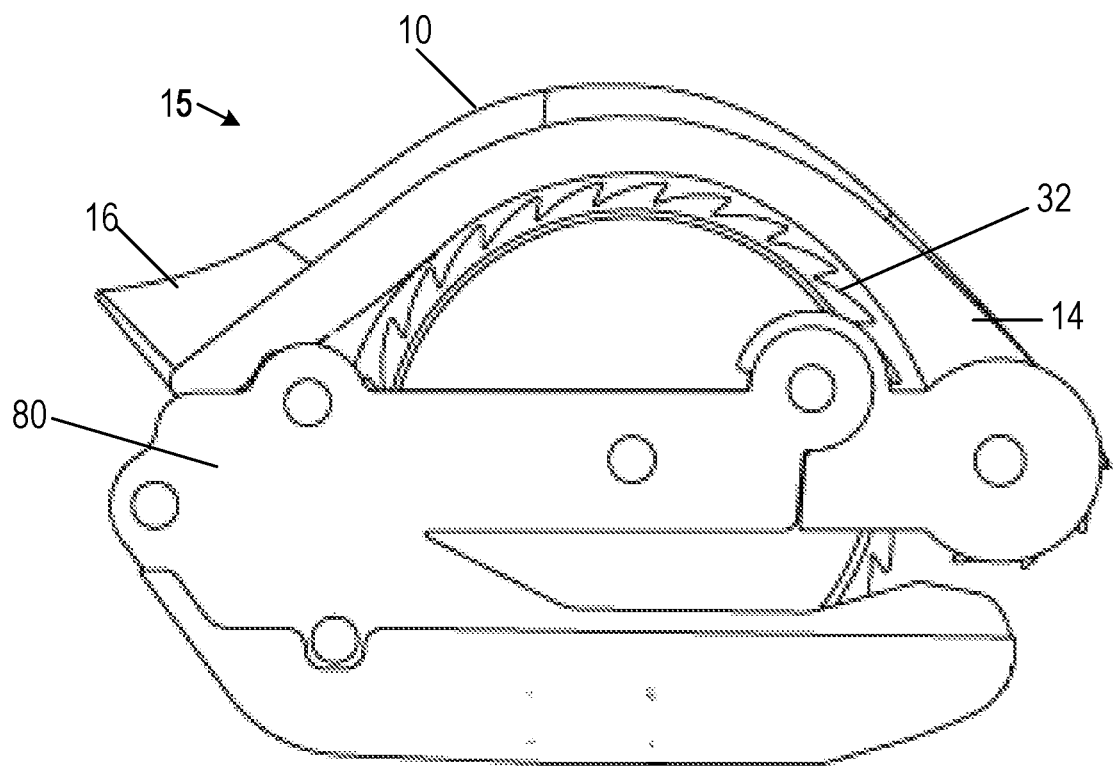
FIG. 5A is a side view of the tie-down device of FIG. 1 in a default closed position.
Figure 6A:
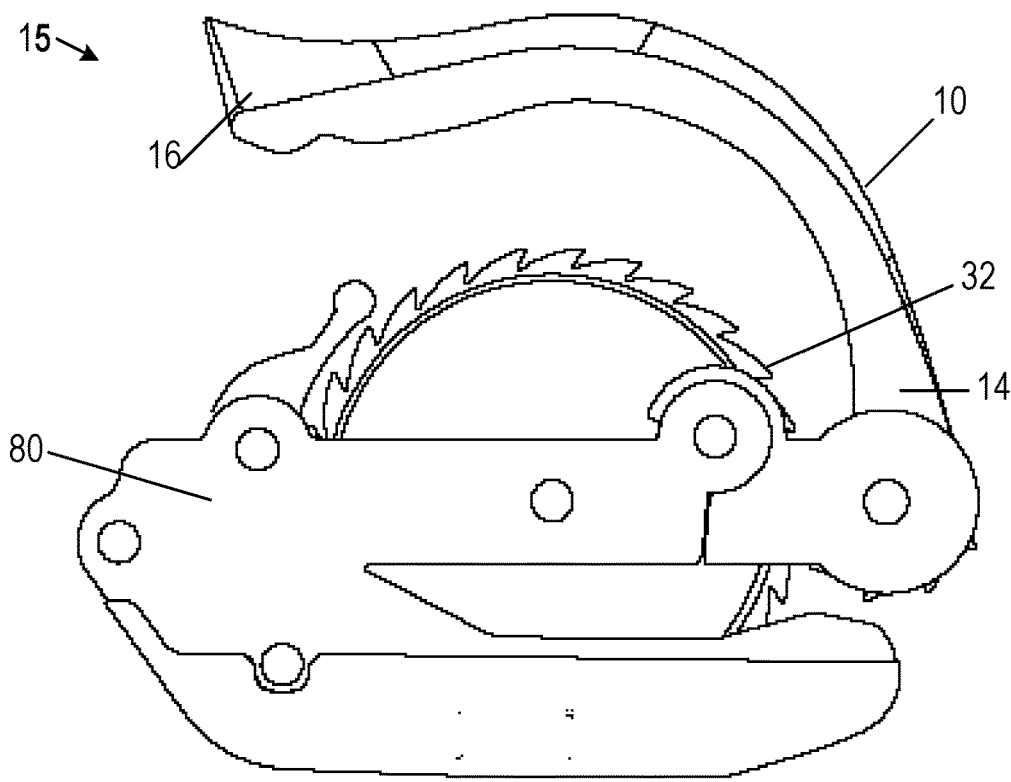
FIG. 6A is a side view of the tie-down device of FIG. 1, in an open handle, tab up position.
Figure 8A:
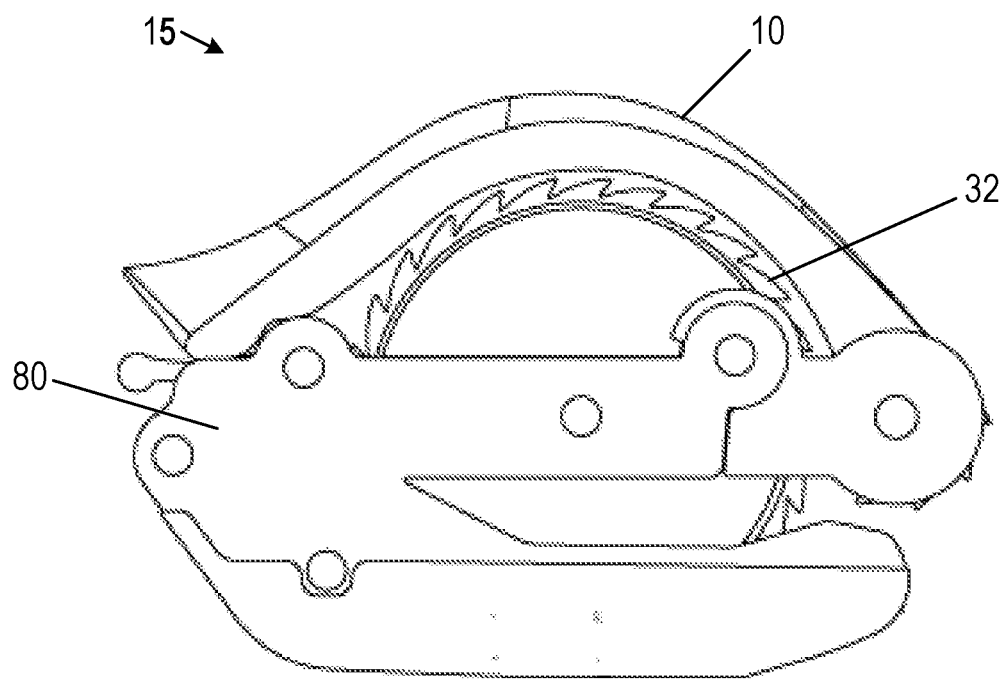
FIG. 8A is a side view of the tie-down device of FIG. 1, in a closed handle, tab down position.
Figure 8B:
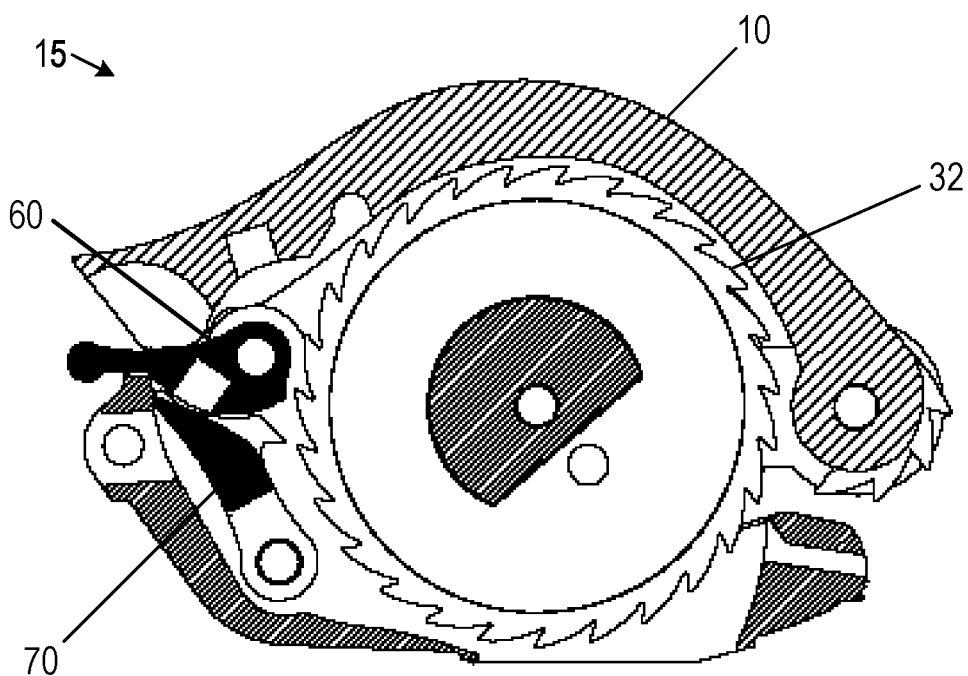
FIG. 8B is a cross-sectional view of the tie-down device of FIG. 8A.

The handle 10 can be pivoted up and down relative to the body 80, such as in a ratcheting motion to shorten the extendable anchor 100. The handle 10 can be pivotably connected to the body 80 at a distal end 14 of the handle 10, thereby allowing the handle 10 to pivot between closed and open positions, as shown in FIGS. 5A and 6A, respectively. The handle 10 can have a curved shape that allows the handle 10 to extend around the spool 30, such as when the handle 10 is in the closed position, as shown in FIGS. 8A and 8B. When in the closed position, the handle 10 can be adjacent to an outer perimeter of the spool 30. When the handle pivots to the open position, the distance between the proximal end 16 of the handle 10 and the spool 30 increases, as shown in FIGS. 5A and 6A.

Hinge elements 20 connect the handle 10 to the body 80, as shown in FIGS. 1 and 2A. The hinge elements 20 can each include a handle hinge pin and a body hinge pin. The handle hinge pin can pass through a hole 22 through the width of the distal end 14 of the handle 10, as well as holes through the pair of hinge elements 20 on opposite sides of the handle 10. The body hinge pin can pass through holes 24 to couple the pair of hinge elements 20 to either side of body 80. When the handle hinge pin and body hinge pin are connected, the handle 10 can pivot through open and closed positions when the proximal end 16 of the handle 10 is lowered or raised, as shown in FIGS. 5A and 6A.

The distal end 14 of the handle 10 rotates about the handle hinge pin and can provide a pivot point for the handle. The distal end 14 of the handle 10 is hinged to the body 80 by hinge elements 20. The distal end 14 of handle 10 has a semicircular shape with handle teeth 12 around a portion of the semicircular perimeter of the distal end 14 of the handle 10, as shown in FIG. 2B. The handle teeth 12 can include periodic jagged edges for engaging with spool teeth 32 to enable a ratcheting motion between the handle 10 and the spool 30 when the handle 10 pivots with respect to the body 80.

In some embodiments, the tie-down device may include a first gear and a second gear. The first gear may comprise the distal end of the handle and the handle teeth. The second gear may comprise the spool and the spool teeth. The first gear may have a circumference smaller than a circumference of the second gear. The first gear may be configured to drive the second gear. For example, as a user lifts the handle, the first gear may engage the second gear such that the first gear is driving the second gear into rotational motion. The ratio between the sizes of the two gears can be proportional to the resulting torque. For example, a second gear with 4 times the circumference (or number of teeth) as the first gear can have a 4:1 gear ratio, therefore the output torque can be four times greater than the input effort supplied by the user at the handle. Some ratcheting tie-downs can include long handles in order to supply the necessary torque for maximum tie-down tension.

In some embodiments as described herein, the tie-down device may allow a user to achieve a greater tension (output torque) with a much smaller lever arm (handle) than a traditional single gear ratcheting mechanism. The dual gear system can require less effort or strength to drive the handle thereby providing greater ease of use to the user while producing the same or greater torque/tension to be applied to the tied-down object using a much smaller/compact device.

The spool 30 can wind and unwind the extendable anchor 100, which may be wound around a spindle 38, as shown in FIG. 2B. The spool 30 may include two plates 37, spool teeth 32, and an elongate shaft 34. The spool 30 may also include an affixing point 36 and a spindle 38 (see FIG. 2B). The two plates 37 may be circular in shape. The elongate shaft 34 may be perpendicular to, and configured to pass through a center of the two plates 37. The two plates 37 may provide structural support for the spool teeth 32. The spool teeth 32 may be positioned around a circumference of each of the two plates 37. The spool teeth 32 may have a width wider than the thickness of each of the two plates 37. The spool teeth 32 may include periodic jagged edges for engaging with the handle teeth 12, responsive to the handle 10 being in an open position. The spool teeth 32 and/or handle teeth 12 may facilitate a ratcheting motion between the handle 10 and the spool 30. In some embodiments, the extendable anchor 100 may be placed off center along an axis perpendicular to the elongate shaft 34. In some embodiments, other spring or recoil mechanisms may be used.

Referring to FIG. 1, a ratcheting motion may occur responsive to the handle 10 being raised and lowered. For example, when the handle 10 is raised, the distal end 14 and handle teeth 12 may rotate in a first rotational direction. The handle teeth 12, rotating in the first rotational direction, may interlock with the spool teeth 32 causing the spool 30 to rotate in a second rotational direction. As the spool 30 rotates in the second rotational direction, the spool may wind the extendable anchor 100, such that the extendable anchor 100 wraps around the spindle 38.

When the handle 10 is lowered, the distal end 14 and handle teeth 12 may rotate in a second rotational direction. Lowering of the handle 10 may cause the handle teeth 12 to disengage interlocking with the spool teeth 32, thereby disengaging the rotational motion of the spool 30. For example, as the handle 10 is raised and lowered, the extendable anchor 100 tightens (winds) each time the handle 10 is raised, but does not unwind each time the handle 10 is lowered.

For example, each hinge element 20 can include a first hinge that pivotably couples the handle 10 to the hinge element 20 and a second hinge that pivotably couples the hinge element 20 to the body of the tie-down device 15. Additionally, the hinge element 20 can allow the handle to form a first open position (see, for example, FIG. 9B) and a second open position (see, for example, FIG. 10B). The first open position can allow the handle teeth 12 to engage the spool teeth 32 and the second open position can allow the handle teeth 12 to be positioned a distance away from the spool teeth 32. This distance can allow the handle teeth 12 to move past the spool teeth 32 as the handle 10 is lowered to the closed position without engaging or binding the spool teeth 32 and handle teeth 12.

In some embodiments, the handle 10 may include an angular range of motion. The angular range of motion may determine a length (or amount) that the extendable anchor 100 wraps around the spindle 38. The length of the extendable anchor 100 that wraps around the spindle 38 may determine an amount of tension in the extendable anchor 100. The angular range of motion may be provided such that additional ratcheting motions (e.g., raising and lowering the handle 10) may continue to increase the tension in the extendable anchor 100. Once the desired tension is met, the handle 10 may be lowered into the closed position.

An affixing point 36, such as a pin around which the extendable anchor 100 is sewn, can be used to affix a first end of the extendable anchor 100 (see FIGS. 2A and 2B). The extendable anchor 100 may be wrapped around a spindle 38 at approximately the center of the spool, corresponding to a portion of the elongate shaft 34 between the two plates 37. The second end of the extendable anchor 100 may be thread through an opening 84 in the body 80 of the tie-down device 15. The opening 84 may include a curved profile that can prevent twisting of the extendable anchor 100 as the extendable anchor 100 is extended and/or retracted relative to the body of the tie-down device 15. The segment of the extendable anchor 100 that is outside of the body 80 increases in length as the extendable anchor 100 unwinds, and decreases in length as the extendable anchor 100 winds onto the spindle 38. A second anchor may be of fixed length. The fixed length anchor 110 can be affixed to the tie-down device 15 at one end through a hole 82 that accommodates a pin in the body 80 of the tie-down device 15. The hole 82 in the body 80 of the tie-down device 15, to which the fixed length anchor 110 is attached, can be at an opposite end of the body 80 of the tie-down device 15 as the opening 84 through which the extendable anchor is thread. In some embodiments, the tie-down device may include two extendable anchors. A two extendable anchor tie-down device may include a secondary spool configured to retract the second extendable anchor. Alternatively, the two extendable anchors may be configured to anchor from two openings and retract onto the same spool.

The extendable anchor 100 and/or the fixed length anchor 110 can be a flat, longitudinal ribbon or webbing. The opening 84 through which the extendable anchor 100 is thread can be in the shape of a slot, of a size that accommodates the extendable anchor 100 but is sufficiently small to prevent the extendable anchor 100 from folding or curling as it passes through the opening. A hook, clasp, loop, or similar clasping mechanism can be attached to the end of the ribbon that is not affixed to the tie-down device 15. The clasping mechanism can be large enough so that it does not fit through the opening of the tie-down device 15 through which the extendable anchor threads, so that the end of the extendable anchor 100 is not drawn into the tie-down device 15.

For example, the extendable anchor 100 can unwind or extend in a second rotational direction and wind or retract in a first rotational direction opposite the second rotational direction. The springs 40 positioned on either side of the spool can impart a radial force in the first rotational direction. The radial force imparted by the springs 40 may be substantially constant, and substantially equal to each other. If the radial force imparted by the springs 40 is unopposed, or opposed by a radial force less than the force imparted by the constant force, the extendable anchor 100 can retract or wind (e.g., the radial force in the first rotational direction is greater than the radial force in the second rotational direction). If opposed by a radial force that is greater than the force imparted by the springs, the extendable anchor can extend or unwind (e.g., the radial force in the second rotational direction is greater than the radial force in the first rotational direction). If the opposing force equals the radial force in the first rotational direction imparted by the springs, the extendable anchor 100 neither winds nor unwinds. In various embodiments, the rotational (or angular) directions may be reversed, such that the spool winds in a second rotational direction and unwinds in a first rotational direction. In these embodiments, the springs 40, handle teeth 12, and spool teeth 32 are oriented in the opposite rotational (or angular) direction as in FIG. 1.

The springs 40 can exert a constant angular force on the spool 30 in the first rotational (winding) direction. In the absence of other forces, the springs 40 keep the spool 30 from releasing the extendable anchor 100. The springs 40, on either side of the two plates 37, may surround the elongate shaft 34. Spring covers 50 may be configured to cover the springs 40. For example, the spring covers 50 may be positioned on an outer side of each of the springs 40. The spring covers 50 may be circular in shape and may be substantially the same diameter as the two plates 37. As with the two plates 37, the elongate shaft 34 may pass through the center of the spring covers 50. Each of the springs 40 may have a radial band that winds in at least one concentric circle. A first end 43 of each of the springs 40 may be slotted into the elongate shaft 34. The opposite end of each of the springs 40 may be folded over to form a fold 41, into which a flat tab 52 (cut into each of the spring covers 50) is placed. By fixing both ends of each of the springs 40, the spring can be wound during assembly so that a substantially constant radial spring tension is maintained. In some embodiments, the springs 40 may be of different sizes.

One advantage of including two or more springs 40, as shown in FIG. 1, is that a second spring may allow for redundancy in case a first spring fails. Having more than one spring may allow smaller and/or more compact springs to be used while maintaining the requisite radial force needed to retract (wind) the extendable anchor 100. In some embodiments, the tie-down device 15 may have only one spring.

A tab 60 may operate as a mechanical input switch that a user pivots to enable or disable ratcheting of the extendable anchor 100, by pivoting to an up position and a down position, respectively. In various embodiments, the surface of the tab 60 may be of a contrasting color to other components of the tie-down device 15 such that the position of the tab 60 can be immediately apparent to a user. The handle 10 may be configured to cover the tab 60 when the handle 10 is in the closed position, which can assist with securing the tab 60 in the up position. The cog 70 may be configured to selectively engage with the spool 30, based on the position of the tab 60, as discussed in further detail herein.

When the tab 60 is in the up position, the top of the tab 60 may come into contact with the proximal end 16 of the handle 10. The handle 10 may have a mating groove 19 (as shown in FIG. 2B) into which the top of tab 60 fits. Tab 60 may include a receptacle 64 into which a tab magnet 68 (as shown in FIG. 2B) fits. When the tab 60 is in the up position, and the handle 10 is lowered towards closure, attractive magnetic force between the tab magnet 68 and the handle magnet 18 may cause the handle to snap into a closed position.

When in the tab 60 is in the up position, the tab 60 may allow the cog 70 to move forward and engage the spool 30, due to interlocking contact between cog teeth 76 and spool teeth 32. When the cog 70 is engaged with the spool 30, the spool 30 will not spin freely, and will only move in the first rotational (winding) direction, preventing the extendable anchor 100 to unwind further, thereby facilitating the tightening, winding, ratchet motion described herein. The curved surface 62 of the tab 60 acts as a cam that increases engagement with the cog 70, making it easier to release an object being held on engaged teeth when in use.

When the tab 60 is moved to the down position, the tab 60 may engage to cog 70 along the curved surface 62 and the curved surface 74, such that the cog 70 pivots away from the spool 30. The cog teeth 76 may not engage with the spool teeth 32, and therefore the spool 30 may not be prevented from spinning freely by the cog.

The cog 70 can include a torsion spring (not pictured), a curved surface 74, and cog teeth 76. The torsion spring may be assembled such that the pin passes through the center loop of the torsion spring. The torsion spring may engage the internal surface 72 of the cog 70 and an internal surface of the body 80, thereby creating a substantially constant rotational force directed towards the spool teeth 32, to engage with the spool teeth 32 when they are in close proximity to the cog 70. For example, the torsion spring may force the cog 70 to remain engaged with the spool teeth 32 when not being acted upon by the tab 60. The curved surface 74 may engage with the curved surface 62 of the tab 60, which may allow for smooth motion between positions. The cog teeth 76 may engage with the spool teeth 32 when the cog 70 is pivoted towards the spool 30 and the tab 60 is in the up position. When the cog 70 is pivoted away from the spool and the tab 60 is in the down position, the cog teeth 76 may not engage with the spool teeth 32.

The body 80 may be hingedly attached to the handle 10 via the hinge elements 20. The body 80 may house the spool 30, the springs 40, and the spring covers 50, through which the elongate shaft 34 may pass. A pin, or shaft, may pass through shaft-mounting holes 86 in the body 80. The hole in the elongate shaft 34 may allow the pin or shaft to pass through both shaft-mounting holes 86 in the body 80. The elongate shaft 34 may allow the central feature of each of the springs 40 to be engaged and rotate with the spool 30 in order to wind/unwind each of the springs 40. The hole on the spring covers 50 may allow the elongate shaft 34 to pass through and be flush, or slightly recessed from, the surface of the spring covers 50. The pin may be inserted through one or more of the concentric parts. The pin and/or spring covers 50 may remain stationary relative to the body 80. The hole in the elongate shaft 34 may be coupled to the spool 30 and may be configured to spin with the spool 30 and/or the spring, accordingly. The tab 60 and cog 70 may be mounted on the body through tab mounting holes 85 and cog mounting holes 87, respectively. The tab 60 and cog 70 may be mounted with pins that may be coupled relative to the body 80, allowing the parts to move and pivot freely about an axis. The body 80, spool 30, spring covers 50, tab 60, and cog 70 can, for example, be formed from die cast aluminum and/or stamped steel. The body 80 may include opening 84, through which the extendable anchor 100 may pass. The body 80 may include a hole 82 for a pin, to which the fixed length anchor 110 can be attached.

Figure 11:
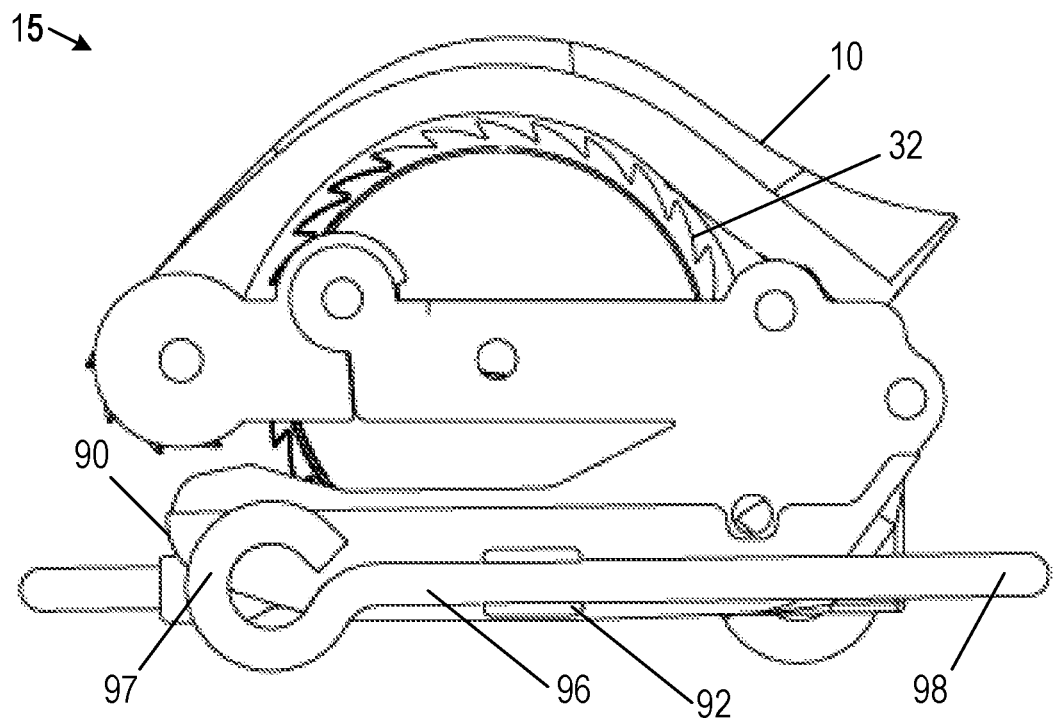
FIG. 11 is a side view of the tie-down device of FIG. 1 in the closed position with hooks.

The over-molded body 90 may fit over the body 80 to prevent rubbing or damage to surfaces by the body 80. The over-molded body 90 can be incorporated in to the surface of the body 80. The over-molded body 90 can, for example, be formed from a plastic, rubber, or composite material. Over-molded body 90 may include a hook guide 92 and a hook receptacle 94. Hook 96 can be snapped into, and retained by the hook guide 92, as depicted in FIG. 11. The hook receptacle 94 may hold the tip of a hook in place via, for example, a press-fit.

As shown in FIG. 2A and FIG. 2B, the tie-down device 15 can include an extendable anchor 100 and a fixed length anchor 110 extending from opposite sides of the tie-down device 15. The handle 10 may be in a closed position. Handle teeth 12 may be visible around a portion of the circumference of the hinge elements 20. The tab 60 may be in an up position. The tab 60 may fit within the mating groove 19 in the handle. The handle magnet 18 and tab magnet 68 may be in contact. The cog 70 may be pivoted towards, and engaged with, the spool 30. The two plates 37 provide structural support for the spool teeth 32. The affixing point 36 may be a hole configured to accommodate a pin used to affix one end of the extendable anchor 100, which may wind around spindle 38.

Figure 3:
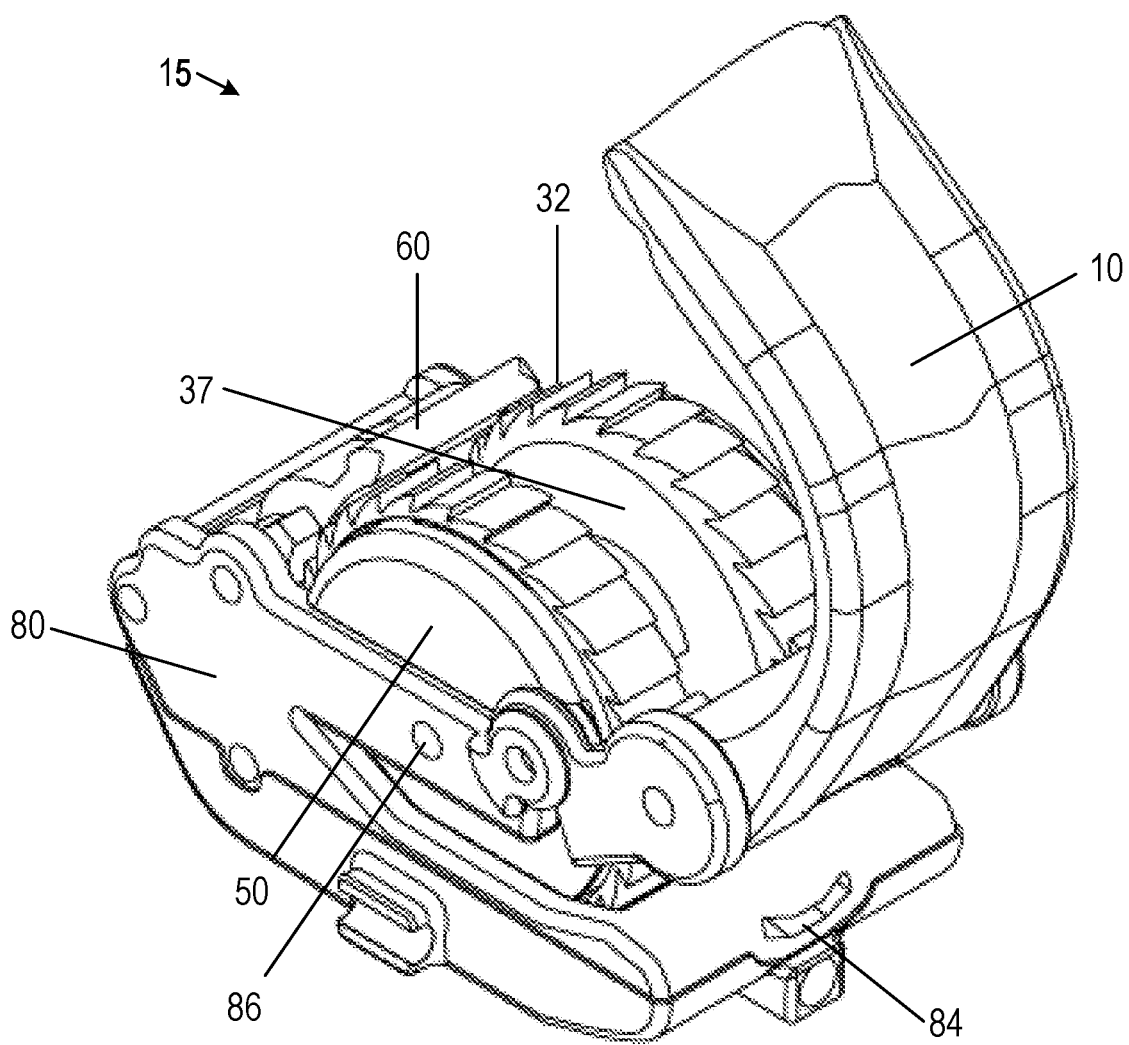
FIG. 3 is an isometric view of the tie-down device of FIG. 1.

As shown in FIG. 3, the tie-down device 15 may be in an open position when the handle 10 is pivoted away from the spool 30 and the tab 60 is in an up position. The spring covers 50, the two plates 37, and spool teeth 32 can be mounted to the body 80 via shaft-mounting holes 86.

Figure 4:
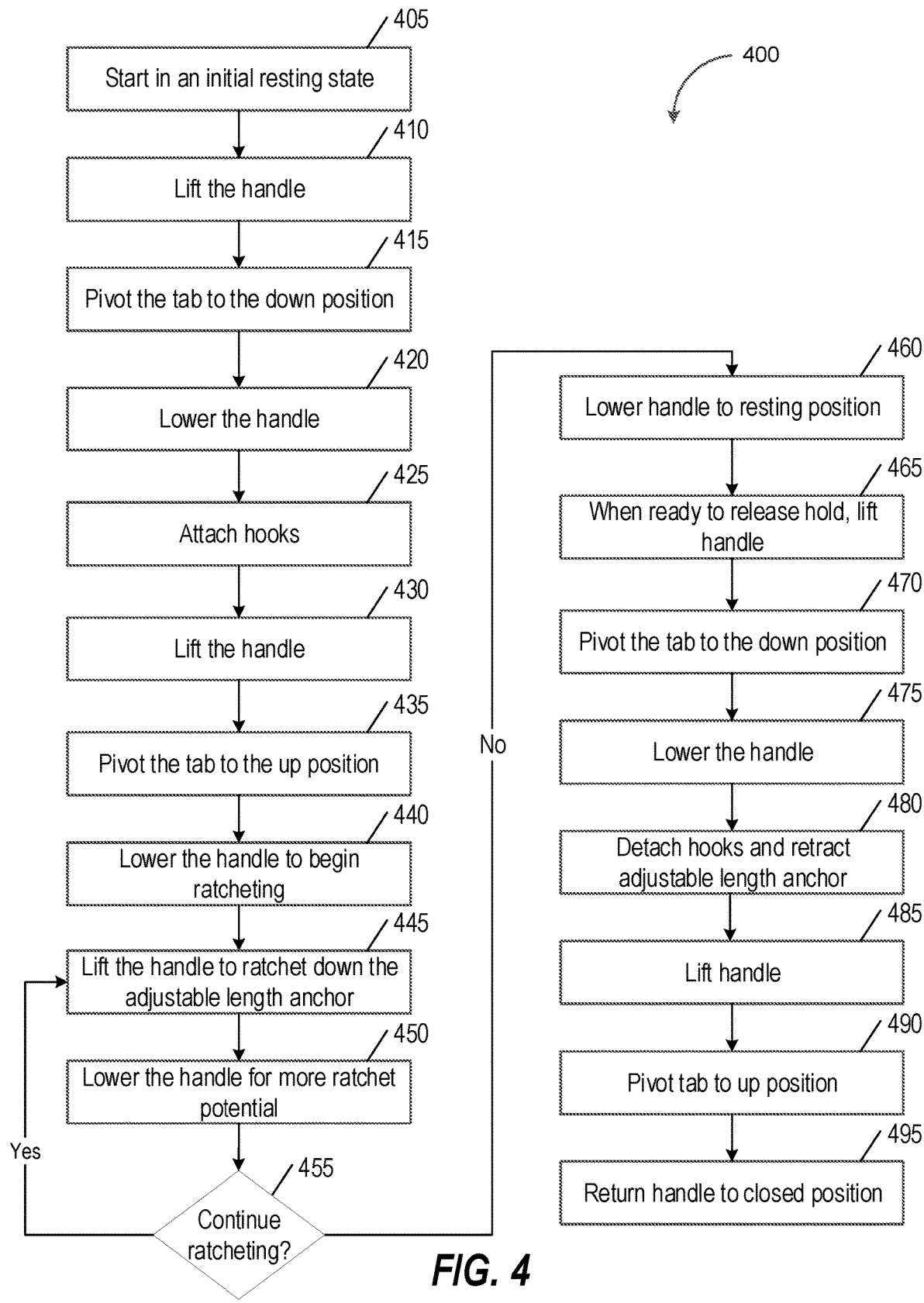
FIG. 4 is a flowchart of a method for using the tie-down device of FIG. 1.
Figure 5B:
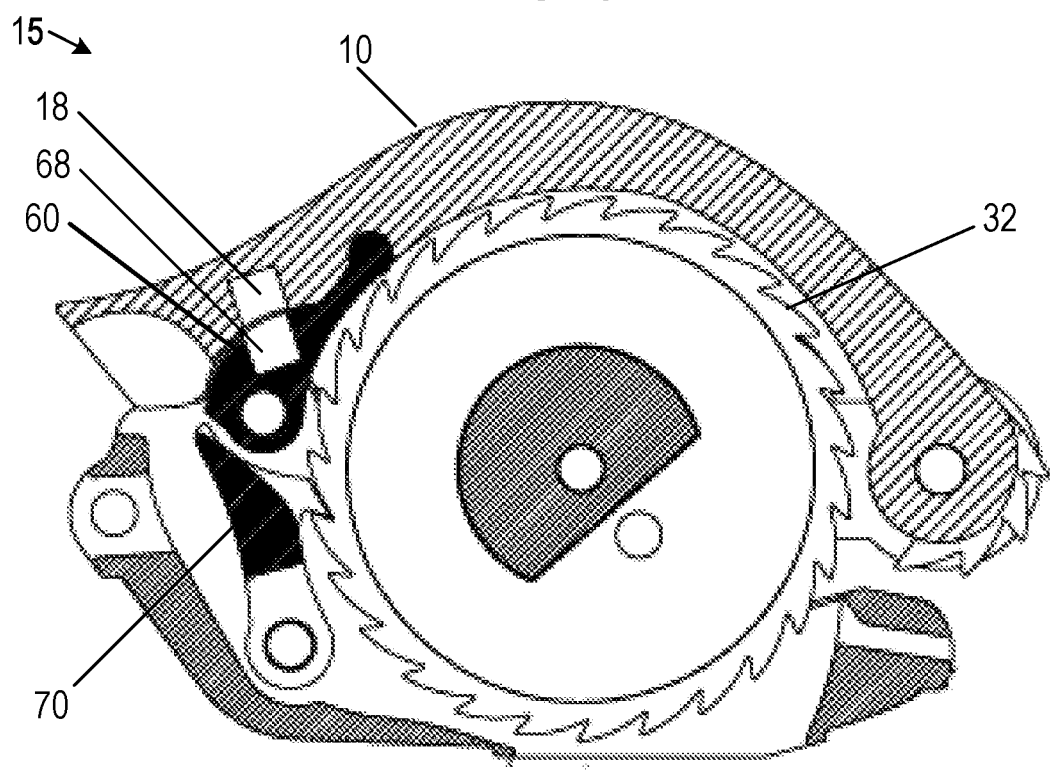
FIG. 5B is a cross-sectional view of the tie-down device of FIG. 5A in the default closed position.

FIG. 4 illustrates a flowchart of an example method 400 for using the tie-down device 15. In 405, the tie-down can be stored in an initial resting state or closed position, as shown in FIGS. 5A and 5B. In the closed position, the tab 60 can be up and locked into place by the handle 10, such as by magnetic attraction between the handle magnet 18 and tab magnet 68, and by fitting the tab 60 into the mating groove 19. In the initial resting state or closed position, the extendable anchor 100 can be fully retracted. In addition, the tab 60 can be in the up position, and the cog 70 can prevent the spool from spinning freely in one direction, thus preventing more anchor from being released.

Figure 6B:
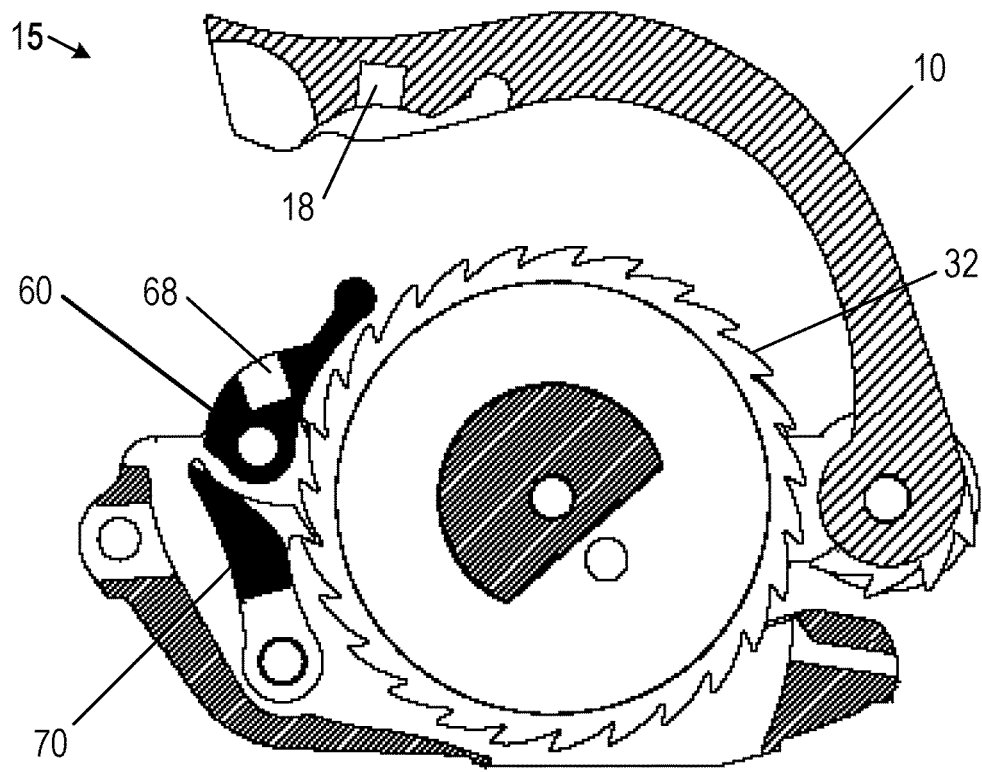
FIG. 6B is a cross-sectional view of the tie-down device of FIG. 6A.

In 410, the handle 10 can be lifted to an open position with the tab in an up position, as shown in FIGS. 6A and 6B. When the handle 10 is lifted, the tab 60 can be exposed and accessible to the user.

Figure 7A:
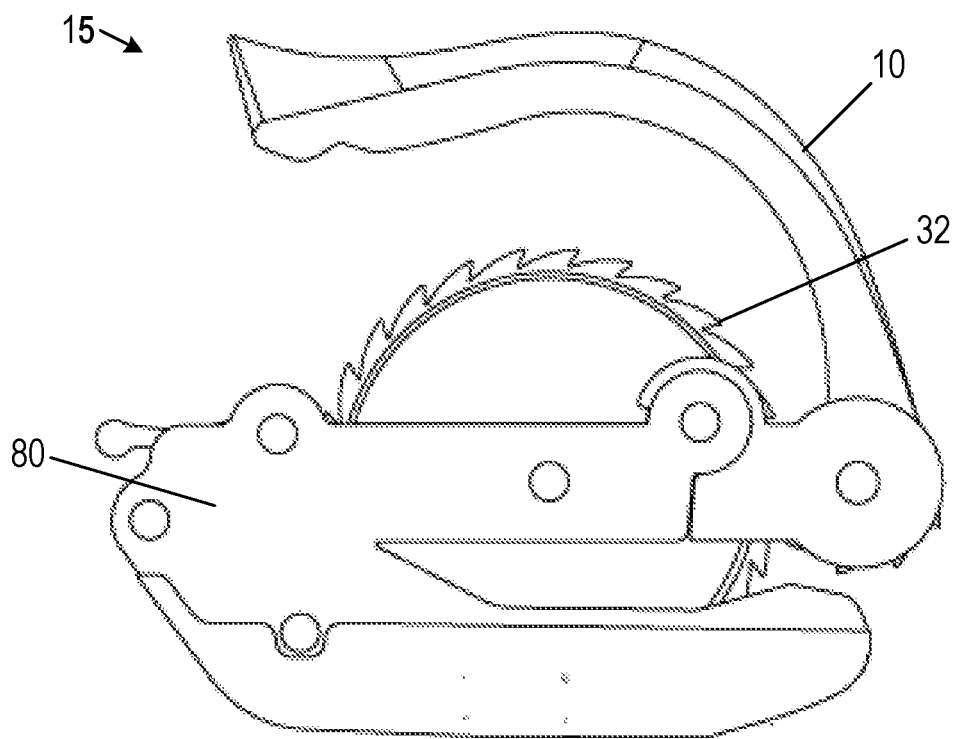
FIG. 7A is a side view of the tie-down device of FIG. 1, in an open handle, tab down position.
Figure 7B:
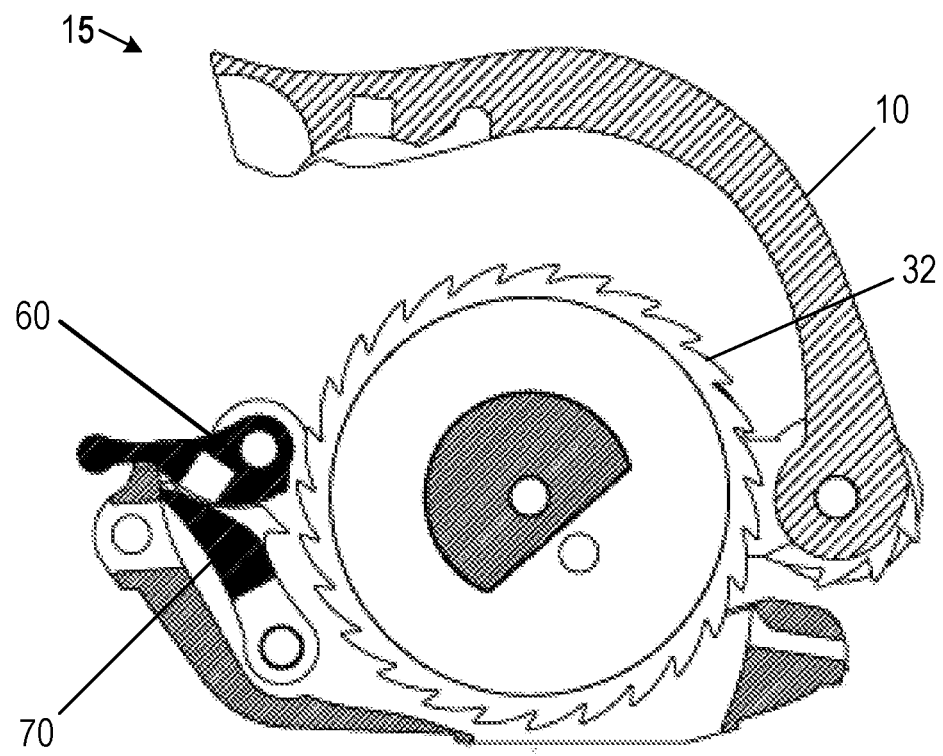
FIG. 7B is a cross-sectional view of the tie-down device of FIG. 7A.

In 415, the tab 60 can be pivoted to the down position when the handle is in the open position, as shown in FIGS. 7A and 7B. Moving the tab 60 to the down position may disengage the cog 70 from the spool 30. The tab 60 can include a cam-shape that allows the tab 60 to engage with the cog 70, thereby applying increasing force and causing the cog 70 to pivot away from the spool 30.

In 420, the handle can be lowered into a closed state with the tab in the down position, as show in FIGS. 8A and 8B. The handle 10 may be in a closed state, and tab 60 may be in a down position. This position can ensure that the handle teeth 12 and the spool teeth 32 do not engage with each other, and may help keep hands away from moving parts.

In 425, a hook or other attachment mechanism affixed to fixed length anchor 110 can be attached to a first location. Similarly, another hook or attachment mechanism affixed to an extendable anchor 100 can be pulled from the tie-down device 15 and attached to a second location. The springs 40 can apply a constant force that maintain tension on the retractable, extendable anchor 100.

In 430, the proximal end 16 of the handle 10 can be lifted and pivoted away from the body 80 of the tie-down device 15. Once the handle 10 is lifted, the tab 60 can be exposed and accessible to the user, as shown in FIGS. 7A and 7B.

In 435, the tab 60 (now exposed) can be pivoted to the up position. FIGS. 6A and 6B, show the handle 10 lifted, and the tab 60 in the up position, making it possible for the cog 70 to engage with the spool 30. When engaged, the spool 30 may only move in a first rotational (winding) direction, which prevents unwinding of the extendable anchor 100.

In 440, the proximal end 16 of the handle 10 can be lowered to begin ratcheting the tie-down device 15. FIGS. 5A and 5B show the handle 10 lowered with the tab 60 in an up position. This places the handle in position to begin tightening the extendable anchor 100 by ratcheting motions.

Figure 9A:
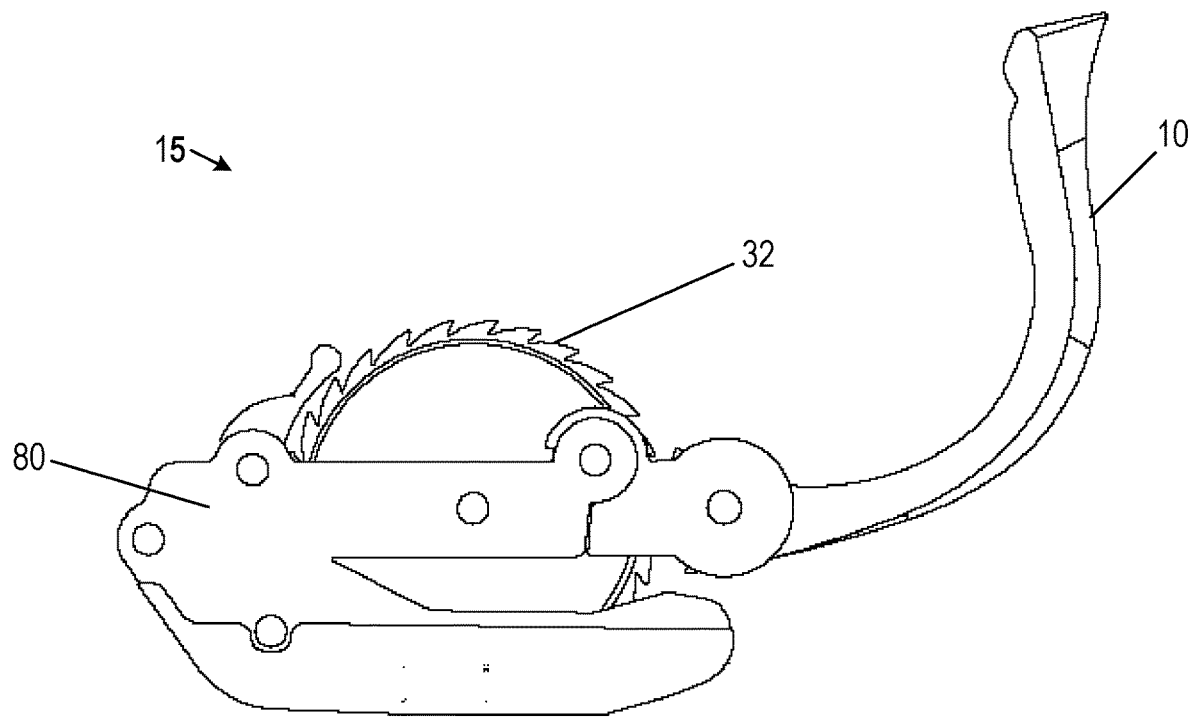
FIG. 9A is a side view of the tie-down device of FIG. 1, in a handle back, tab up, gear engaged position.
Figure 9B:
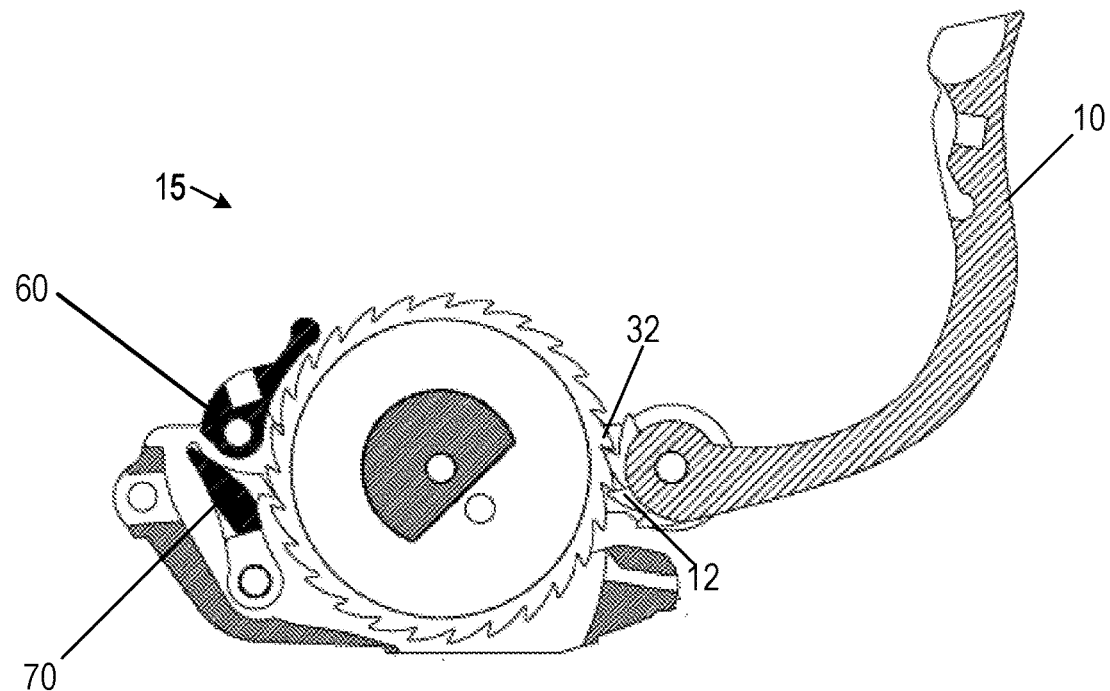
FIG. 9B is a cross-sectional view of the tie-down device of FIG. 9A.

In 445, the proximal end 16 of the handle 10 can be lifted away from the body 80 of the tie-down device to the handle 10 position of FIG. 9A (side view) and the corresponding cross-sectional view of FIG. 9B. This lifting motion of the proximal end 16 of the handle 10 ratchets down the extendable anchor 100. The tie-down device 15 may be in a handle back, tab up, gear-engaged position during this motion. As the handle 10 is lifted to a handle back position, the handle teeth 12 may engage with the spool teeth 32, causing the spool 30 to rotate in the first rotational (winding) direction. This may retract the extendable anchor 100 via mechanical force (as opposed to the more passive, initial use of spring force). The cog 70 being engaged prevents the spool 30 from spinning in a second rotational (unwinding) direction, which may maintain the tension created by the ratcheting movements. The surface portions 26 of the hinge elements 20 may bear down on the flat, mating surface of the body 80 when the teeth engage and bear an object. There may be no gap between the handle teeth 12 and the spool teeth 32, as shown in FIG. 9B.

In 450, the handle 10 can be lowered and lifted one or more times in succession for more ratchet potential and increased tensioning of the extendable and/or fixed length anchors. As shown in FIG. 10B, the tie-down device 15 may be in a handle back, tab up, gear-disengaged position. When the handle 10 is lowered toward the closed position, the incorporated hinge points associated with the hinge elements 20 may allow for a specific range of motion. The hinge may open while the handle 10 is being closed, thus allowing the handle teeth 12 to move freely past the spool teeth 32. As shown in FIG. 10B, a gap may be between the handle teeth 12 and the spool teeth 32. Therefore, as the handle 10 is lowered, the handle teeth 12 may be moved to a position for further ratcheting (winding), as described in 445.

In 455, a decision can be made to continue, or stop, retracting the extendable anchor by the ratcheting motions of 445 and 450. For example, if the extendable anchor 100 and the fixed length anchor 110 are not sufficiently tightened down, then 445 and 450 may be repeated. Responsive to a desired tension in the extendable anchor 100 and/or the fixed length anchor 110 being met, no further tightening (or ratcheting) may be required.

In 460, the proximal end 16 of the handle 10 may be lowered to a closed (resting) position, as shown in FIGS. 5A and 5B, such that the tab 60 may be in the up position. Responsive to the extendable anchor 100 and/or the fixed length anchor 110 meeting a desired tension, the handle 10 may be lowered to a down (closed) position, such as to guard the tab 60 from being accidentally moved while the tie-down device 15 is in use. Tab magnet 68 and handle magnet 18 can be in close proximity to hold the handle in the down position by magnetic force, keeping the tie-down device in a closed position and preventing the tab from being moved. With the tab 60 prevented from being moved, the cog 70 may remain engaged with the spool 30, and the extendable anchor 100 may remain in a taut, wound position.

In 465, the tie-down device 15 may be released by first lifting the proximal end 16 of the handle 10 to gain access to the tab 60. FIG. 6A and FIG. 6B show the tie-down device 15 in an open handle, tab up position.

In 470, the tab 60 can be pivoted to the down position to release hold. Referring to FIGS. 7A and 7B, the tie-down device 15 may be in an open handle, tab down position. The tab 60 may act as a crowbar, adding leverage and allowing for disengaging of the cog 70 with little effort. This may help the user release the mechanism regardless of the object that the cog 70 is holding while preventing the spool from spinning due to tension created by ratcheting process.

In 475, the proximal end 16 of the handle 10 may be lowered to the closed position. FIGS. 8A and 8B show the tie-down device 15 in a closed handle, tab down position. Lowering the handle 10 to the closed position may allow the spool 30 to spin freely without interference from the handle teeth 12.

In 480, the hook 96 may be detached to release the extendable anchor 100 and/or the fixed length anchor 110 from their anchor locations. Once released, the spool 30 is free to spin, the springs 40 may become the primary force retracting (winding) the anchor. The extendable anchor 100 can retract and wind back onto the spool 30.

In 485, the proximal end 16 of the handle 10 can be lifted, to allow access to the tab 60, as shown in FIGS. 7A and 7B. The tie-down device 15 may now be in an open handle, tab down position.

In 490, the tab 60 may be pivoted to an up position. Referring to FIG. 6A and FIG. 6B, the tie-down device 15 may be in an open handle, tab up position. Pivoting the tab 60 to the up position may engage the cog 70 with the spool 30, preventing the spool 30 from spinning in the direction that would allow more of the extendable anchor 100 to be released. In this position, the spool 30 may not be prevented from retracting the extendable anchor 100.

In 495, the proximal end 16 of the handle 10 may be returned to a closed position. FIGS. 5A and 5B illustrate the handle 10 in a lowered position, and the tab 60 in the up position. The tie-down device 15 may be in an original state.

Figure 10A:
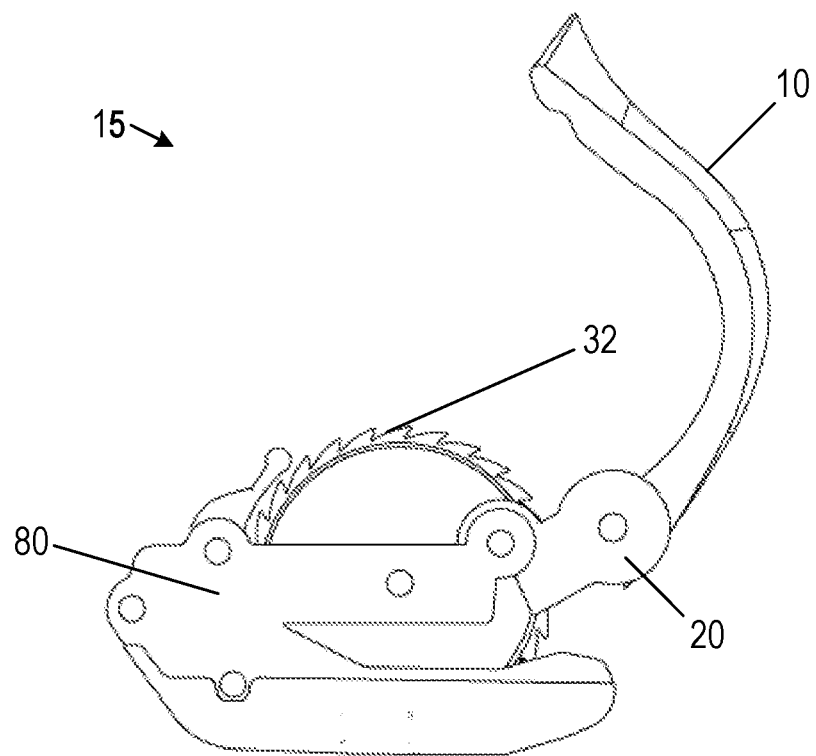
FIG. 10A is a side view of the tie-down device of FIG. 1, in a handle back, tab up, gear disengaged position.
Figure 10B:
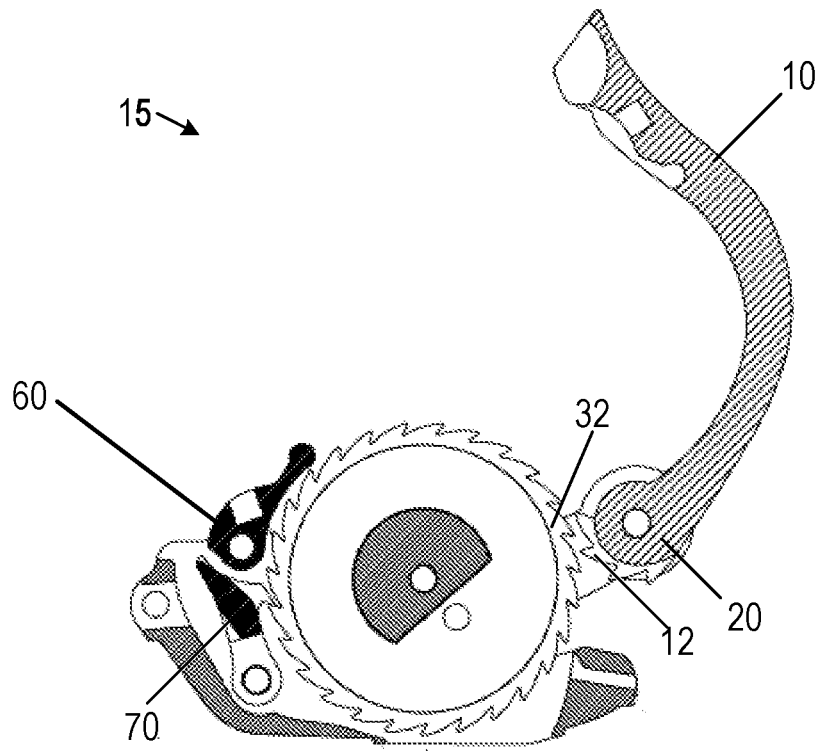
FIG. 10B is a cross-sectional view of the tie-down device of FIG. 10A.

FIG. 10A shows the hinge elements 20 pivoted to place the handle in a second open position that allows the handle teeth 12 to bypass the spool teeth 32 without engaging or binding.

Figure 12:
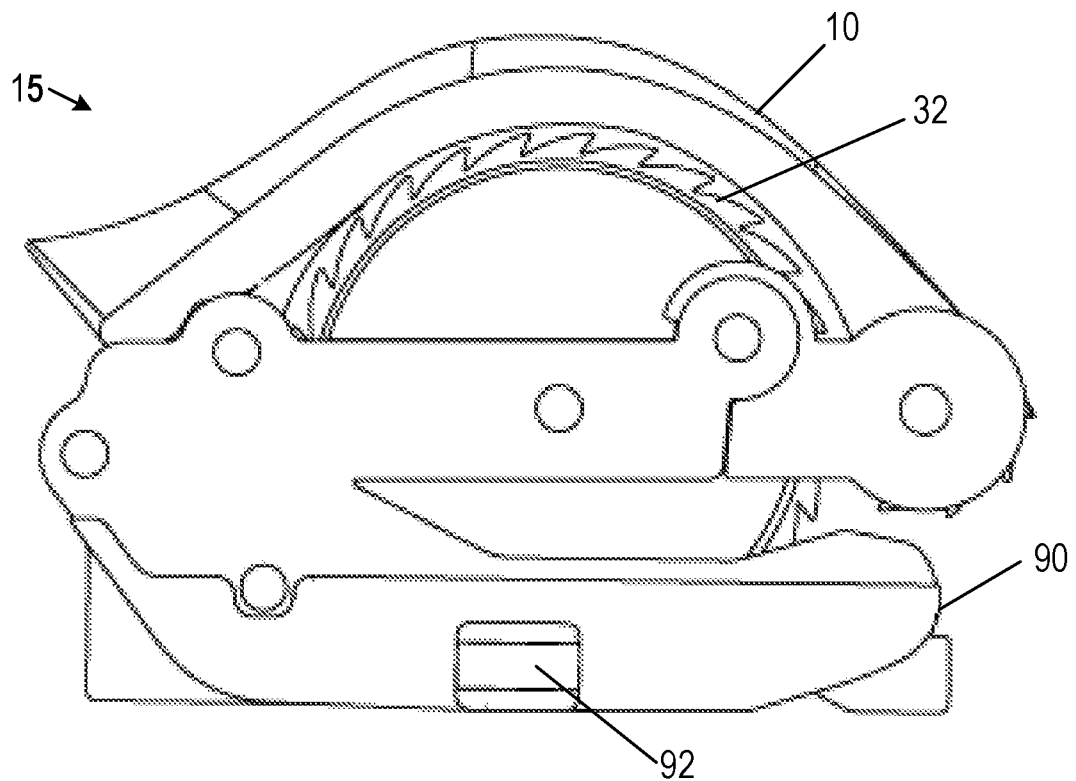
FIG. 12 is a side view of the tie-down device of FIG. 1 in the closed position with hook attachment features.

FIG. 11 shows a hook 96 detachably coupled to the over-molded body 90 of the tie-down device 15. The hook 96 may include a securing end 97 and an attachment end 98. The attachment end 98 may be affixed to an end of extendable anchor 100 or fixed length anchor 110. For example, the attachment end 98 of hook 96 may be looped or sewn into the end of extendable anchor 100 or fixed length anchor 110. The hook 96 may be used to pull an extendable anchor 100 or a fixed length anchor 110 that is affixed to the attachment end 98 to an anchor cleat, hole, loop, appendage, or edge, to which the securing end 97 of the hook 96 may be attached. The securing end 97 may be in the shape of a circular loop, as shown in FIG. 11. The hook 96 can be snapped into, and retained by the hook guide 92. FIG. 12 is a side view of the tie-down device 15 showing the hook guide 92 with the hook 96 removed.

It should be noted that any ordering of method steps implied by the drawings or description herein is not to be construed as limiting the disclosed methods to performing the steps in that order. Rather, the various steps of each of the methods disclosed herein can be performed in any of a variety of sequences. In addition, as the described methods are merely exemplary embodiments, various other methods that include additional steps or include fewer steps are also within the scope of the present disclosure.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

The invention claimed is:

1. A tie-down device configured to secure a position of an object, the tie-down device comprising:
   an extendable anchor that is extendable from a body of the tie-down device and configured to secure to a first location;
   a spool configured to assist with controlling a length at which the extendable anchor extends from the body, the spool comprising a circular plate including a first plurality of ratchet teeth along a circumference of the circular plate;
   a handle having a distal end pivotably coupled to the body and including a second plurality of ratchet teeth, the handle being configured to engage the first plurality of ratchet teeth when the handle is in a first open position and disengage from the first plurality of ratchet teeth when the handle is in a closed position, wherein pivoting the handle into the first open position causes rotation of the spool in a first rotational direction;
   a cog configured to pivot between an engaged position and a disengaged position, the cog configured to prevent the spool from rotating in a second rotational direction when the cog is in the engaged position thereby preventing the extendable anchor from further extending from the body; and
   a hinge element including a first hinge that pivotably couples the handle to the hinge element and a second hinge that pivotably couples the hinge element to the body, the hinge element allowing the handle to form the first open position and a second open position, the first open position allowing the second plurality of ratchet teeth to engage the first plurality of ratchet teeth and the second open position allowing the second plurality of ratchet teeth to be positioned a distance away from the first plurality of ratchet teeth.

2. The tie-down device of claim 1, wherein the distance between the first plurality of ratchet teeth and the second plurality of ratchet teeth prevents binding of the first plurality of ratchet teeth and the second plurality of ratchet teeth when the handle is moved to the closed position.

3. The tie-down device of claim 1, wherein the extendable anchor retracts into the body when the spool rotates in the first rotational direction and extends from the body when the spool rotates in the second rotational direction.

4. The tie-down device of claim 3, wherein the engaged position of the cog comprises the distal end of the cog being engaged with at least one of the first plurality of ratchet teeth to prevent rotation of the spool in the second rotational direction and allowing rotation of the spool in the first rotational direction.

5. The tie-down device of claim 4, wherein rotation of the spool in the first rotational direction increases tension along at least the extendable anchor when the extendable anchor is secured to the first location.

6. The tie-down device of claim 5, wherein the disengaged position of the cog comprises the distal end of the cog being disengaged from the at least one of the first plurality of ratchet teeth, thereby allowing release of tension along at least the extendable anchor.

7. The tie-down device of claim 6, further comprising a tab configured to be pivoted between a first position and a second position, the first position causing the cog to be in the engaged position, the second position causing the cog to be in the disengaged position.

8. The tie-down device of claim 7, wherein pivoting of the handle to the first open position includes engaging the second plurality of ratchet teeth with the first plurality of ratchet teeth and causing the spool to rotate in the first rotational direction.

9. The tie-down device of claim 8, wherein pivoting of the handle to the closed position includes disengaging the first plurality of ratchet teeth from the second plurality of ratchet teeth.

10. The tie-down device of claim 9, wherein the tab includes a first coupling feature and the handle includes a second coupling feature that is configured to releasably couple to the first coupling feature, and wherein coupling of the first coupling feature to the second coupling feature secures the tab in the first position.

11. The tie-down device of claim 9, further comprising a fixed length anchor configured to secure to a second location, wherein retracting the extendable anchor increases tension along at least one of the extendable anchor and the fixed length anchor to thereby secure the object at the position.

12. The tie-down device of claim 1, wherein the tie-down device includes a load capacity of 50 pounds to 100 pounds.

13. The tie-down device of claim 1, wherein the handle is curved and configured to cover the spool and prevent exposure of at least the first plurality of ratchet teeth when in the closed position.

14. A method for securing a position of an object, the method comprising:
securing, by a first attachment mechanism, an extendable anchor of a tie-down device to a first location, the tie-down device comprising:
a spool configured to assist with controlling a length at which the extendable anchor extends from a body, the spool comprising a circular plate including a first plurality of ratchet teeth along a circumference of the circular plate;
a handle having a distal end pivotably coupled to the body and including a second plurality of ratchet teeth, the handle being configured to engage the first plurality of ratchet teeth when the handle is in a first open position and disengage from the first plurality of ratchet teeth when the handle is in a closed position, wherein pivoting the handle into the first open position causes rotation of the spool in a first rotational direction; and
a cog configured to pivot between an engaged position and a disengaged position, the cog configured to prevent the spool from rotating in a second rotational direction when the cog is in the engaged position thereby preventing the extendable anchor from further extending from the body;
securing, by a second attachment mechanism, a fixed length anchor of the tie-down device to a second location;
pivoting a tab to a first position to thereby place the cog in the engaged position, the engaged position of the cog preventing rotation of the spool in the second rotational direction; and
pivoting the handle to the first open position thereby engaging the second plurality of ratchet teeth with the first plurality of ratchet teeth and causing an increase in tension along at least the extendable anchor.

15. The method of claim 14, further comprising:
pivoting a hinge element to move the handle into a second open position, wherein the second open position allows the second plurality of ratchet teeth to be positioned a distance away from the first plurality of ratchet teeth; and
pivoting the handle to the closed position thereby covering the spool and preventing exposure of the first plurality of ratchet teeth.

16. The method of claim 14, further comprising pivoting the tab to a second position to place the cog in the disengaged position, thereby allowing rotation of the spool in the second rotational direction.

* * * * *